March 13, 1962  K. F. RENTSCHLER  3,024,713
PHOTOGRAPHIC CAMERA
Filed Dec. 18, 1959  4 Sheets-Sheet 1
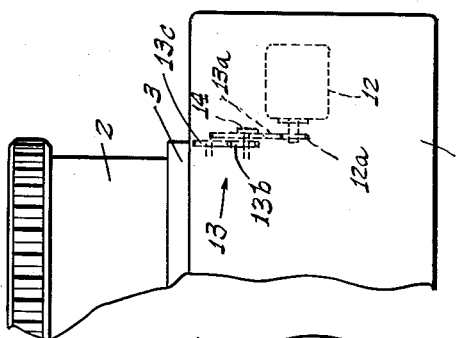
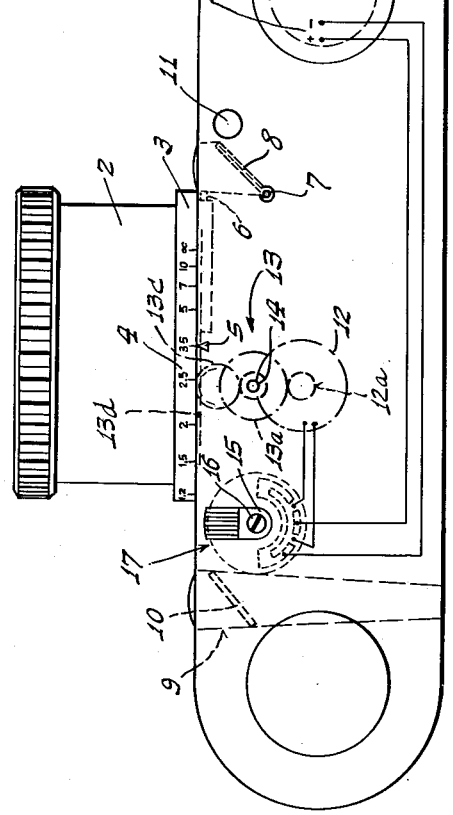
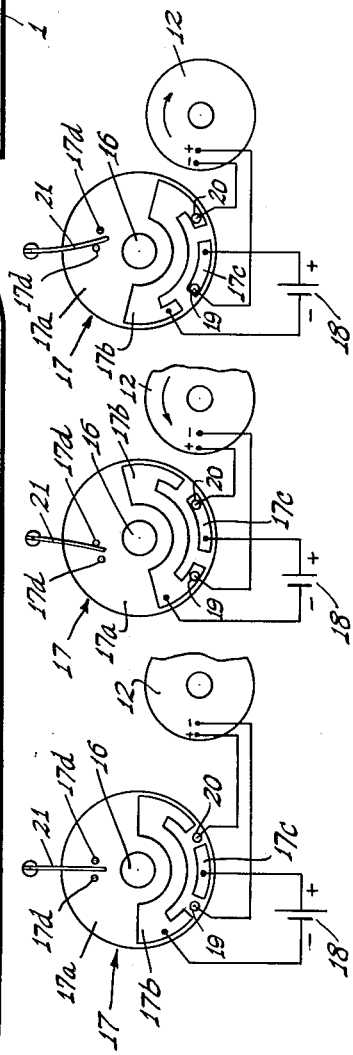
INVENTOR.
Karl F. Rentschler
BY
Munn, Liddy, Daniels & March
ATTORNEYS

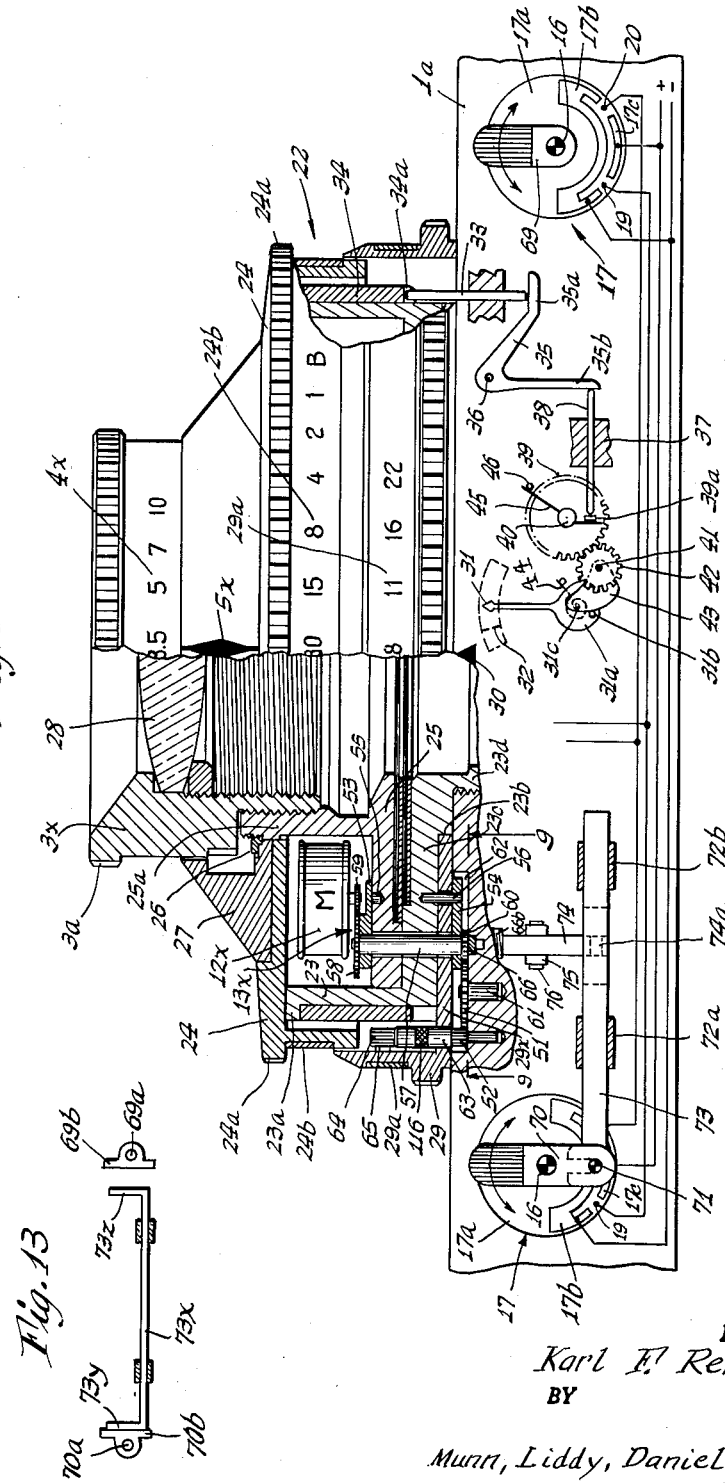

March 13, 1962 K. F. RENTSCHLER 3,024,713
PHOTOGRAPHIC CAMERA
Filed Dec. 18, 1959 4 Sheets-Sheet 3
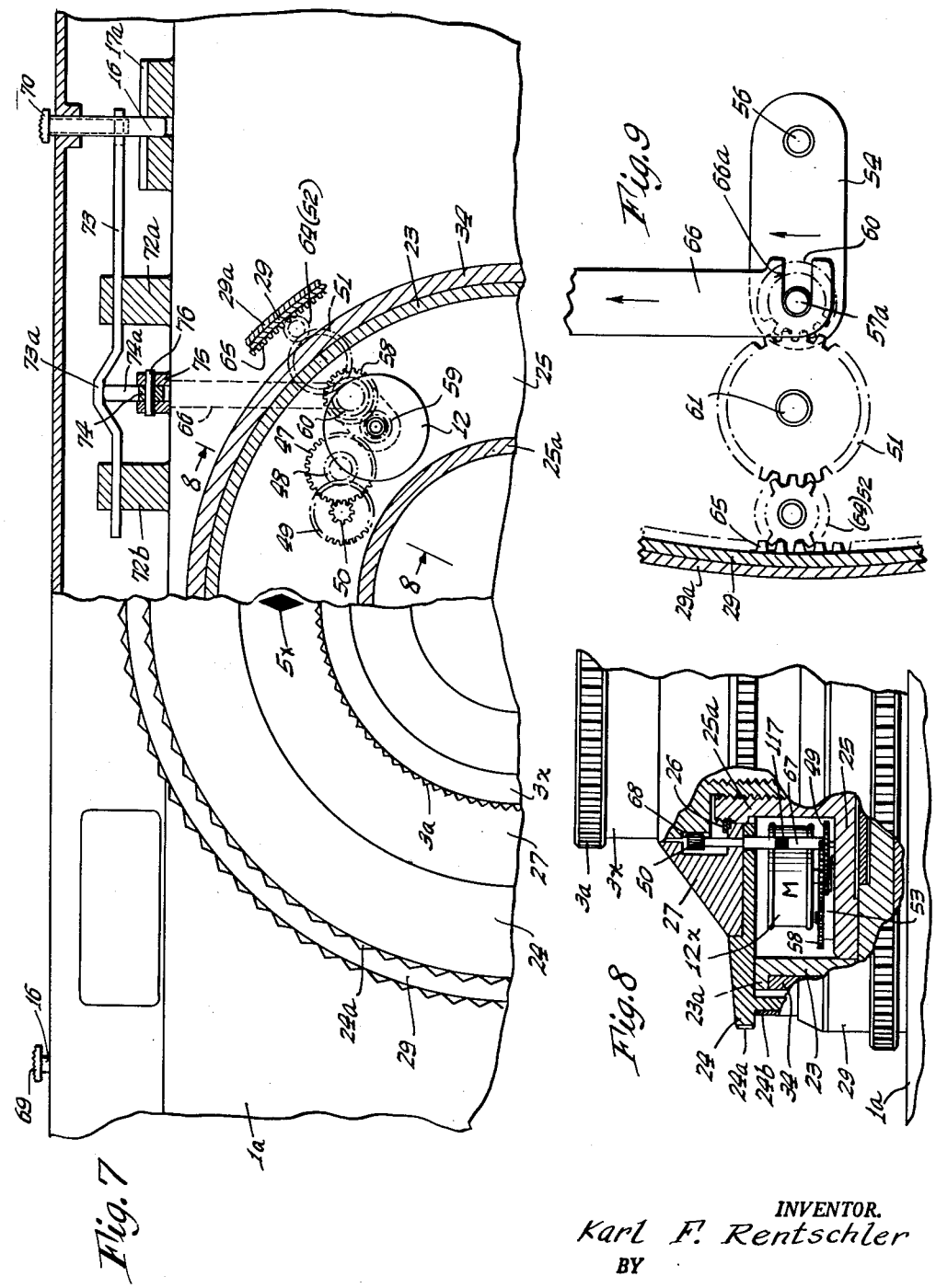
INVENTOR.
Karl F. Rentschler
BY
Munn, Liddy, Daniels & March
ATTORNEYS

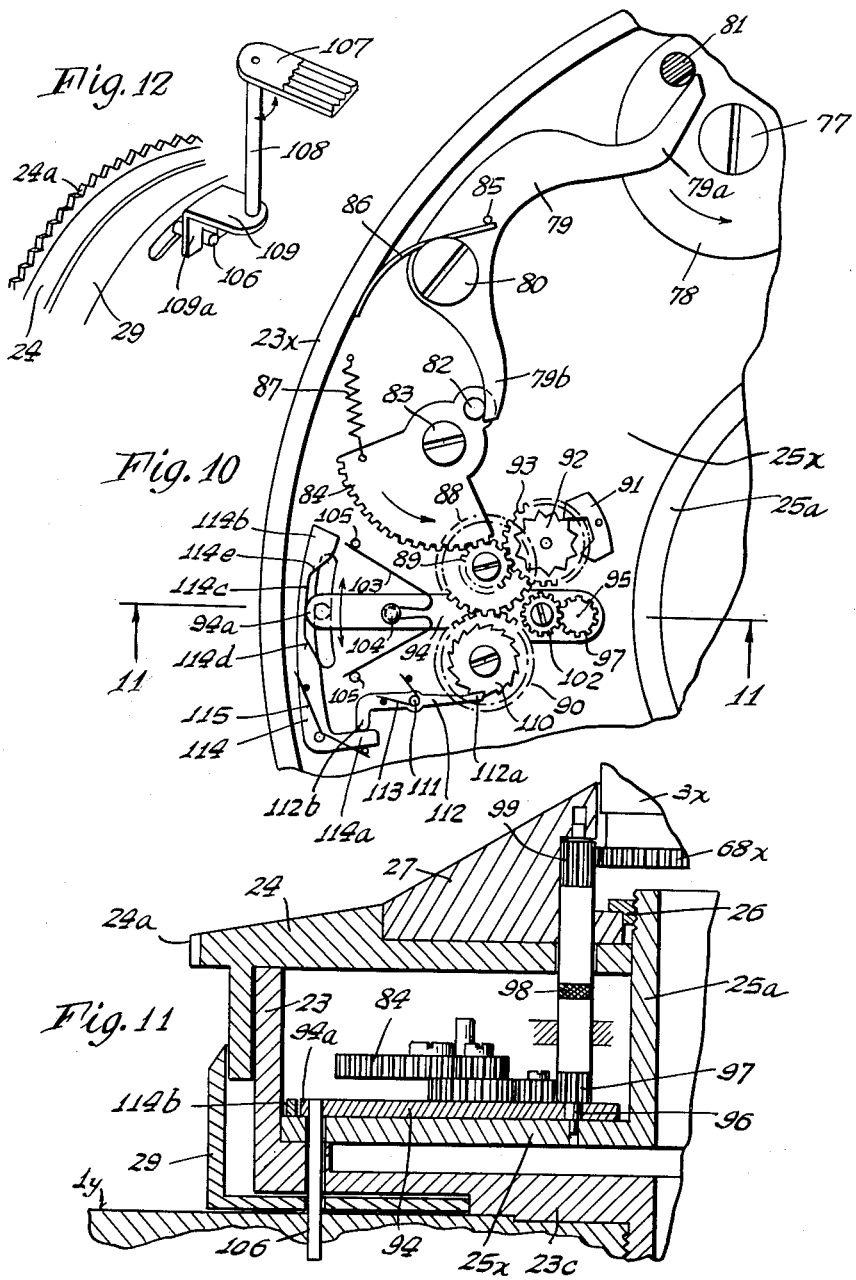

United States Patent Office 3,024,713
Patented Mar. 13, 1962

3,024,713
PHOTOGRAPHIC CAMERA
Karl F. Rentschler, Calmbach (Enz), Germany, assignor to Alfred Gauthier, G.m.b.H., Calmbach (Enz), Germany, a corporation of Germany
Filed Dec. 18, 1959, Ser. No. 860,550
Claims priority, application Germany Dec. 24, 1958
17 Claims. (Cl. 95—10)

This invention relates to photographic cameras of the type having setting members for adjusting the diaphragm, the exposure time or shutter speed, and the photographic range or distance.

An object of the invention is to provide a novel and improved photographic camera of the above type, which is characterized by optimal operational simplicity and clarity, together with a fast operational speed and a high degree of reliability.

A further object of the invention is to provide an improved, automatic powered control mechanism for actuating the setting members of a camera, which mechanism has utility with and may be applied to cameras of many different types, independently of and without limitations being imposed by the particular structures of such cameras.

The above objects are accomplished in accordance with the invention by the provision of a novel combination, in a camera, of setting members, powered driving device adapted to actuate the said setting members, and manually operable means for rendering the driving device operative to drive one or more of such setting members to effect a powered adjustment of the same, and for rendering said device inoperative to drive the said setting member or members, the latter being also adjustable manually independently of the driving device.

A camera utilizing the present invention has important advantages over prior, well-known cameras of the above described type. For one thing, there is obtained an especially simple mode of operation, together with a more rapid speed of adjustment or operation of the camera.

A feature of the invention resides in the fact that, by the provision of the improved powered driving or adjusting means it is no longer necessary for the operator to grip or grasp any of the setting members to effect their adjustment, but instead there is merely required of him the actuation of a simple switch button or the like, involving merely a slight finger pressure. Since the powered driving or adjusting device is suitable for use in other types of cameras, aside from the camera illustrated and described herein and independently of the specific structures including the diaphragm, speed and distance setting members of such other cameras, the invention has a far-reaching importance and in each circumstance of installation the above mentioned advantages are fully realized.

The accordance with the invention, as set forth in a particularly advantageous embodiment thereof, the powered driving or adjusting device may be advantageously connected to the setting members which are to be adjusted by means of a releasable coupling. With such construction there is obtained a benefit in the event that the driving or adjusting device should break down or cease to function, in that the exposure and range setting of the camera may still be easily adjusted and effected by hand operation of the setting members in the well known manner.

In the illustrated embodiment of the invention the said releasable coupling is constituted as a friction coupling or drive device. This construction results in the greatest possible simplicity in the operation of the camera, and in a desirable compactness and saving of space together with the greatest possible functional reliability of the device, especially since such friction coupling or drive makes it unnecessary to provide special meshing or actuating members for effecting the coupling or driving connection.

A particularly advantageous form of the invention is had when the powered driving or adjusting means is constituted as an electric motor, preferably a low-voltage motor capable of being operated by direct current.

Further, in accordance with the present invention, the said low-voltage direct-current motor which is utilized for driving or adjusting one of the setting members provided for the diaphragm, shutter speed or photographic range, is constituted as a miniature motor having a high speed, and is connected to at least one of the setting members by means of a speed reduction transmission involving one or several reduction gears.

Such organization enables the driven side of the transmission to have a sufficiently great moment of rotation to insure reliable adjustment of conventionally constructed setting devices as employed for the photographic range or distance, the diaphragm, and the exposure time or shutter speed.

The combination of a high speed miniature motor in conjunction with a speed reducing transmission as provided by the invention, results in the very important advantage that the electric motor and the reduction gear or gears can be arranged in the interior of the camera case. This enables a closed exterior or appearance of the camera to be had, prompting operational clarity and reliability.

In addition, by the provision of a friction type coupling or drive between the speed reducing transmission and the setting member or members which are to be adjusted there is obtained a particularly easy operation of the setting members if it should be necessary to manually adjust the camera, since the turning of the setting members does not involve any turning or movement of the speed reducing transmission associated therewith.

As briefly set forth above, the combination of a miniature high speed motor and a reduction gear as provided by the invention has the advantage that the powered driving or adjusting device together with the structural members connecting the device to effect adjustment of the respective setting members of the camera may be disposed within the confines of the camera in a compact and space-saving manner. Also, a special advantage is had with such organization where, as made possible by the invention, the driving motor and reduction gear are disposed in the interior of the shutter housing. In such case, the driving device comprising the motor and speed reducing transmission or reduction gearing may be constructed to fit into a space within the shutter which is no larger than that occupied by a well-known delayed-action device or escapement mechanism.

The above outlined organization results in the greatest possible efficiency and maximum accuracy of adjustment, since there are not needed additional transmission members, for bridging a space or distance between the reduction gearing and the setting members which are to be power operated. In addition, there is an advantage when the mechanical driving means which effects powered adjustment of the setting members carried by the intralens shutter is disposed within the shutter housing, in that it enables a quicker and more reliable assembly of the camera to be had.

The inventive concept of providing a manually connectable and disconnectable powered driving or adjusting means (one with manual control of the energization) for effecting a powered adjustment of the diaphragm, shutter speed and distance setting members, as already stated above, results in important advantages when utilized in all types of cameras. Further, in accordance with the invention, the benefit of such powered adjustment is especially evident when the invention is utilized in a camera having an automatic exposure control, as where the exposure value is set in a well-known manner by bringing about a coincidence between an exposure meter needle or indicator and a reset or tracing member (or setting mark).

With such a camera, in accordance with the invention, the powered driving means may be connected to actuate a control member which is associated with or forms part of the exposure meter coupling, said control member moving simultaneously with movement of the particular setting member which is coupled to the meter.

An extremely high degree of operational simplicity and fast operating speed is obtainable in a camera as constructed in this manner. Since the exposure meter needle and the reset or tracing member in modern cameras are often mirrored in the view finder, it becomes only necessary for the operator to aim the camera at the object which is to be photographed and to then, without interrupting his observation of the object, bring about the required coincidence between the reset (tracing) member and the exposure meter needle by simple actuation of a switch button or the like which renders operative the powered adjustment mechanism. Upon the said coincidence being attained the operator then merely releases the shutter. This fast and simple setting operation as made possible by the invention is of special advantage when taking photographs of moving objects.

An especially simple and economical camera construction is had where the camera has separately operable speed and diaphragm setting members, by utilizing the powered driving device to effect adjustment of the diaphragm setting member. This arrangement results in the advantage that the speed setting member remains set at a speed value which is suited to the movement of the object which is to be photographed, and is not disturbed or readjusted unintentionally. Moreover, when a camera is constructed in this manner there is involved a minimum number of structural members and required a minimum amount of space, since extensive or elaborate transmission mechanisms can be dispensed with. In addition, this manner of automatizing or making automatic the setting operation requires but a comparatively small adjusting force, which favorably affects the dimensions of the powered driving mechanism.

Where, as provided by the invention, more than one setting member is to be power driven, the operational simplicity and reliability may be enhanced, in accordance with the invention, by the provision of a separate, manually operable means for controlling the energization of or connecting and disconnecting the powered driving device for each of the setting members which is to be power driven.

The operation of such a photographic camera may be further simplified by arranging each such manually operable connecting and disconnecting means to be cooperable with another operating device or control which controls the clockwise and counterclockwise movements of the powered driving means. This other or additional operating device or control which has control over the clockwise and counterclockwise movement of the powered driving mechanism can be constituted in various ways. Especially advantageous embodiments thereof are apparent in the drawings and the description relating to the drawings.

In order to prevent a situation where simultaneous unintentional operation of the several manually operable connect and disconnect devices causes powered adjustment of the various power-operated setting members, which might result in possible damage to the mechanism and would constitute a source of annoyance for the operator, the invention provides (in the case where more than one setting member is to be power driven) an organization wherein the different manually operable devices are interlocked to insure that only one such device can be operated at a time. The interlocking means, moreover, serves largely to avoid faulty operation of the mechanism on the part of the operator.

In another embodiment of the invention the powered driving device is constituted as a spring motor instead of the electric motor mentioned above, said spring motor also involving a reduction gear mechanism. This type of powered means has an advantage in cases where it is difficult to find space for the source of electrical energy normally required to energize an electric motor, or where an electric motor cannot be accommodated in the camera without impairment of the proper functioning of the shutter or camera mechanism.

A spring-powered driving means for adjusting the setting members, as constituted in the above described manner, involves structural members which may be of very simple shape, and provides a high degree of functional reliability, just as in the case of the electric motor. Moreover, such spring powered driving means offers the important advantage that its operation requires no self-exhausting source of power, as for example, batteries or the like, but instead the powered driving means is always in a condition ready for quick, reliable operation.

In order to not burden the operator with any additional setting operations, and to insure complete readiness of the powered driving means at all times, the spring of the driving mechanism is, in accordance with the invention, stressed or cocked simultaneously and automatically with the setting or cocking of the shutter, this being accomplished by a member which is associated and cooperable with the shutter cocking mechanism.

As provided by the invention, the spring powered driving means and transmission by which it is coupled to the setting members are so arranged and organized that the said members may be power operated in both directions of rotation. For this purpose, the reduction gear is constituted as several groups which may be selectively connected or rendered operative by manual actuation so as to effect a reversal of the direction of movement of the output gear member which meshes with the setting member or members.

Also, in accordance with the invention, there is provided an advantageous locking means or device which further promotes the functional readiness of the spring powered driving means and renders it more easily operative. The said locking device may hold the driving means in a position of readiness after the driving spring has been stressed, and is preferably automatically rendered effective for such function upon completion of the stressing of such spring. The locking device is arranged to be engageable with and disengageable from the spring powered driving means in response to manual actuation of a member of the said selectively connectible gear train or group.

Various embodiments of the present invention are illustrated and described in the accompanying drawings and specification which follow. The advantages and features mentioned above as well as others resulting from the invention will hereinafter become apparent in following such drawings and specification.

FIGURE 1 is a top plan view of a photographic camera constructed in accordance with the invention and having a powered driving motor which is disposed in the interior of the camera and is coupled with a range or distance setting member, by means of a speed reduction transmission or gear.

FIG. 2 is a fragmentary side elevational view of the camera shown in FIG. 1, illustrating the arrangement of the driving motor and transmission therefor.

FIG. 3 is a diagrammatic view showing the driving electric motor and a reversing type control device for the latter, together with circuit connections. The control device is illustrated in normal, inoperative position wherein the motor is unenergized.

FIG. 4 is a view like FIG. 3 but showing the control device actuated in one direction, to effect rotation of the motor in the direction designated by the arrow.

FIG. 5 is a view like FIGS. 3 and 4 but showing the control device as having been oppositely actuated, to effect an opposite rotation of the motor.

FIG. 6 is a fragmentary top view of a camera illustrating another embodiment of the invention, the camera being shown partially in top plan and partially in axial section and the camera casing being shown diagrammatically whereby components and structures disposed within the casing are revealed. The camera is of the intra-lens shutter type, incorporating a well-known device for automatic exposure control. The driving motor is illustrated as within the interior of the shutter housing, and there is shown a transmission means by which the motor may be made to alternately drive the distance setting member or else the diaphragm setting member, the driving of the latter effecting an adjustment of the mechanism for effecting an exposure control.

FIG. 7 is a fragmentary front view of the camera of FIG. 6 partly in front elevation and partly in vertical section, the arrangement of the motor and gear drive in the interior of the shutter being illustrated together with the manually operable connection and disconnection or switch means.

FIG. 8 is a fragmentary view partly in elevation and partly in section, the section being taken on the line 8—8 of FIG. 7.

FIG. 9 is a detail shown partly in elevation and partly in vertical section, the section being taken on the line 9—9 of FIG. 6. This figure shows some of the components provided for coupling the motor with one of the setting members of the intra-lens shutter assembly illustrated in FIGS. 6, 7 and 8.

FIG. 10 is a fragmentary front elevational view of the interior of an intra-lens shutter assembly of a camera, illustrating another embodiment of the invention wherein there is a spring powered driving means. In this figure the driving means is utilized for effecting a powered adjustment of the range or distance setting member.

FIG. 11 is a fragmentary longitudinal sectional view through the intra-lens shutter assembly, taken on the line 11—11 of FIG. 10 and showing the gear means which is coupled with the distance setting member.

FIG. 12 is a fragmentary perspective view of a control device for connecting and disconnecting and also for effecting reversal of the spring-powered driving means shown in FIG. 10.

FIG. 13 is a diagrammatic representation of a mechanical interlock device which may be utilized with the embodiment of the invention shown in FIGS. 6–9 as an alternative construction.

Considering first FIGS. 1 and 2, the housing or casing of the camera is indicated by the numeral 1. Within the camera case 1 there is disposed a shutter mechanism (not shown) of a known type, an understanding of the mode of operation of such mechanism being not essential for the practice of the invention, and the said mechanism being therefore not described herein in detail. Disposed on the front wall of the camera case 1 is a lens assembly 2 having a range or distance setting member 3 which is rotatably mounted and concentric with the optical axis of the lens. The setting member 3 carries a distance scale 4 which is movable with respect to a stationary index mark 5 on the camera case 1, to provide readings or indications.

For the purpose of setting or adjusting the photographic range or distance, the camera shown in FIGURE 1 has a well-known range finder which is coupled with the setting member 3. On the member 3 there is provided a cam 6 acting radially and engageable with a mirror 8 which is pivotal about an axis 7. The image of the object which is to be photographed and which appears in the mirror 8 is reflected onto a semi-permeable mirror 10 located in the view finder 9 and is superposed on the image captured by the left eyepiece, this being effected by a slight pivoted movement of the mirror 8 by rotating the setting member 3. Since the extent of the pivoting movement which is required depends on the distance of the object from the camera, the correct photographic range is obtained by such superposition, and the shutter is now ready for release, as by operating the shutter release button 11 after the proper setting has been effected.

In accordance with the present invention there is provided a manually connectable and disconnectable powered driving means (means having a manually controlled energization) which cooperates with at least one of the setting members for the diaphragm, shutter speed, and photographic range or distance of the camera, thereby to effect an automatic powered adjustment of the same. The advantages of such arrangement, especially relating to the maximum degree of operational simplicity and high speed of operation, have already been described in detail in the introduction to the specification.

In the camera illustrated in FIG. 1 the driving means is an electric motor 12, which is of the low-voltage direct-current type, said motor being of the miniature high-speed kind and driving the range setting member 3 by means of a speed reduction transmission or gear 13. The combination of a miniature, high speed motor with a speed reducing transmission provides a considerable advantage since a relatively high moment of rotation can be obtained on the output gear of the transmission by the fast-running motor. This enables the adjusting resistance which is encountered in the setting members to be readily overcome.

As is apparent from FIGS. 1 and 2, the speed reducing transmission 13 is of the multi-stage spur gear type, having an output gear 13c which is engaged with crown gearing 13d provided on the distance setting member 3.

In order to provide for not only powered adjustment of the setting member 3 by means of the powered driving means shown in the figure, but also adjustment of the setting member by hand, the powered driving means is connected, in accordance with the invention, to the setting member 3 by means of a releasable coupling. I have found that by constituting the said releasable coupling as a friction coupling or drive a considerable advantage is obtained, since relatively little space is required and virtually no maintenance. As shown in FIG. 1, the friction coupling or drive is indicated at 14 and constitutes a portion of the multi-stage spur gear transmission being arranged between the gear member 13a of the speed reducing transmission 13 and the setting member 3, in accordance with the invention. As seen in FIG. 2 the motor 12 has a pinion 12a engaging the spur gear 13a and the latter is connected to a pinion 13b by means of the friction drive 14. The friction drive 14 may comprise a disc which is spring urged into engagement with the gear 13a, the disc being rigid with the pinion 13b whereas the gear 13a is turnable when forced, with respect to the pinion and disc. The pinion 13b meshes with the gear 13c which engages the crown gearing 13d mentioned above as being provided on the setting member 3 and shown diagrammatically in FIG. 1 by a broken outline. The gear 13c constitutes merely a direction-changing idler, and accordingly it may be considered that the pinion 13b has a direct drive to the crown gear 13d, insofar as speed of movement of gear ratio is concerned. Thus, the friction coupling 14 may be considered as interposed between the spur gear 13a and the setting ring 3.

As may be readily observed from FIGS. 1 and 2, both the electric motor 12 and the speed reducing transmission 13 are housed in the interior of the camera case 1. This arrangement protects the motor 12 and the transmission 13 from external influences, as for example, impurities or foreign matter or the like, thereby insuring a high degree of reliability of the entire powered driving mechanism. Moreover, the arrangement by which the powered driving mechanism is disposed entirely within the camera produces a desirable, closed external appearance of the camera, making for easy handling and so forth.

The motor 12 is switched on and off by means of a switch handle 15 projecting from the upper wall of the camera case 1 (FIG. 1). The switch handle 15 has a shaft 16 provided with a bearing in the camera case 1, and the inner end of the shaft 16 is connected to a motor reversing device 17 provided by the invention for effecting either clockwise or counterclockwise turning of the motor.

The control device 17 is shown in various operating positions in FIGS. 3, 4 and 5. The control 17 is shown as comprising a disc 17a formed of insulating material, which is rotatably mounted by and drivingly connected to the shaft 16. Metallic bridges or sectors 17b and 17c are mounted on the disc 17a, the sector 17b being connected to the negative pole of a source of current 18 whereas the sector 17c is connected to the positive pole of the source of current. The current source 18 may be a battery housed within a spool, as for example in the manner shown in copending application Serial No. 814,787, filed May 21, 1959, and entitled Photographic or Cinematographic Camera. Current collectors or brushes 19 and 20 are provided for cooperation with the sectors 17b, 17c, the said brushes being connected respectively to the terminals of the motor 12 and being fixedly mounted with respect to the camera case 1.

When the control 17 is in the position shown in FIG. 3, the current collectors or brushes 19, 20 are located intermediate adjoining ends of the bridges or sectors 17b, 17c and out of engagement with said sectors, thereby resulting in an unenergized condition of the motor. Accordingly, the motor is not driven. If the switch handle 15 is pivoted to the left or counterclockwise the disc 17a is also shifted counterclockwise as seen in FIG. 4. This causes the brush 19 to engage the bridge or sector 17b, and causes the brush 20 to engage the sector 17c. The motor 12 is thus energized and rotates in the direction of the arrow in FIG. 4. In so doing, the motor drives the range setting member through the reduction gearing 13.

If it is intended to have the motor turn in a direction opposite to that shown in FIG. 4, the switch handle 15 is pivoted to the right or clockwise thereby causing the disc 17a to shift clockwise and occupy the position of FIG. 5. The brush 19 is now engaged with the sector 17c, whereas the brush 20 engages the sector 17b. This effects an opposite energization of the motor 12, causing the latter to turn into the opposite direction. When the switch handle 15 is released, the disc 17a is automatically returned to the normal open circuit position shown in FIG. 3, wherein the motor is unenergized.

In effecting such return of the disc 17a to the open circuit position a leaf spring 21 is mounted on the camera case 1, the free end of said spring being located intermediate two pins 17d fixed on the disc 17a. When the disc 17a is turned either to the right or the left, the free end of the return spring 21 is shifted in the manner shown in FIGS. 4 and 5. When the switch handle 15 is released, the return of the disc 17a to its normal position as shown in FIGS. 1 and 3 is effected by the straightening action of the spring 21.

The above described control device has the advantage that it is simple in its construction and functionally reliable as well as extremely compact, requiring but small space whereby it may be readily accommodated without difficulty in the interior of various types of cameras.

Another embodiment of the invention is illustrated in FIGS. 6, 7, 8 and 9, wherein there is shown a photographic camera of the type having an intra-lens shutter assembly together with an automatic exposure control, the exposure setting being effected in a known manner by bringing about a coincidence between an exposure meter needle and a reset or tracing member (or setting mark).

In FIGS. 6-8 the camera housing or casing is indicated by 1a. At the front of the casing 1a there is mounted an intra-lens shutter assembly 22 in a well-known manner. The intra-lens shutter assembly has an exposure time or shutter speed setting ring 24 provided with knurling 24a and having a scale 24b. The setting ring 24 rests against the face or front surface 23a of a shutter housing 23, and bears on the tubular connection 25a of a shutter base plate 25, being maintained in its axial position by means of a front plate 27 secured in place by a threaded ring 26.

The intra lens shutter assembly 22 also has a range or distance setting ring 3x for adjusting a well-known front lens 28 provided at the front of the assembly. The ring 3x is provided with knurling 3a and has a distance scale 4x which is movable with respect to a setting or index mark 5x fixedly disposed on the front plate 27.

The intra-lens shutter assembly 22 further has a diaphragm setting ring 29 provided at its rear, said ring having a bearing on a collar 23b of a tubular connection 23d provided on the bottom wall 23c of the shutter housing 23 and being secured against axial movement by the bottom wall 23d and suitable screws or other retainer means (not shown). The periphery of the diaphragm setting ring 29 is provided with a diaphragm scale 29a which cooperates, as does the shutter speed scale 24b with an index mark 30 fixedly carried by the case 1a of the camera.

As already stated above, the camera shown in FIGS. 6–9 includes a device for effecting an automatic control of the exposure, wherein a readjusting or tracing member is positioned in the upper portion of the camera case, being constituted as a needle 31 and being movable in response to adjusting movement of the diaphragm or speed setting rings 29 or 24, said tracing member being cooperable with an exposure meter needle 32 shown in broken outline in FIG. 6.

A transmission pin 33 slidably mounted in the camera case 1a serves to transmit the motion of the diaphragm setting ring 29 or the speed setting ring 24 to the tracing member 31. The transmission pin 33 is displaceable in a direction parallel to the axis of the shutter, and is shifted when one of the rings 24, 29 is rotated by a cam ring or control member 34, having an axially directed cam 34a facing rearward, that is, facing the front wall of the camera case 1a.

The connection between the control ring 34 carrying the cam 34a and the setting rings 24 and 29 for shutter speed and diaphragm may be effected in various ways. For example, a connection may be effected in the manner disclosed in copending application Serial No. 741,050, filed June 10, 1958, entitled Photographic Camera With Coupled Exposure Meter; or, the control ring 34 could equally well be the differential ring of a well-known toothed differential gear as shown and described in copending application Serial No. 827,323, filed July 15, 1959, entitled Photographic Camera. The particular type of connection between the speed and diaphragm setting rings is not involved in the present invention, and accordingly requires no detailed explanation herein.

The transmission of the longitudinal shifting movement of the pin 33 to the tracing member 31 is effected by means of a bell crank 35 which is pivotally mounted about an axis 36 provided in the camera case 1a. One arm 35a of the bell crank 35 cooperates with the pin 33 whereas the other arm 35b cooperates with a transmission pin 38 which is axially (longitudinally) displaceable in a guide bushing 37. The pin 38 at its other end engages a lug 39a extending at a right angle to the plane of the drawing, carried by a gear 39 which is turnable about a shaft 40 and meshes with a gear 42 turnable on a spindle 41. A cam 43 is fixedly attached to the gear 42 and engages a pin 31b fixed on a lever arm 31a constituting a portion of the tracing member or needle 31. The spindle 31c carrying the tracing member 31 is acted on by a spring 44 which biases it counterclockwise. The pin 31b is thus always maintained in engagement with the cam 43. A second spring 45 is wound about the shaft 40 of the gear 39, and biases the gear counterclockwise to maintain the lug 39a in engagement with the pin 38, and to maintain the pins 38 and 33 in engagement with the bell crank 35 and the latter pin in engagement with the cam 34a. The spring 45 engages a fixed pin 46 on the camera case 1a and engages the lug 39a, as shown. Thus, looseness or play is eliminated in the transmission between the control ring 34 and the tracing member 31.

In the camera illustrated in FIGS. 6–9 the powered driving means comprising the motor 12x and speed reducing transmission 13x is, in accordance with the invention disposed in the interior of the shutter housing 23.

The advantage of such arrangement consists mainly in that the closely juxtaposed positions of the powered driving means and the setting members which are to be adjusted or driven by the same eliminates the need for extensive and complicated transmission members, thereby insuring a simple and economical production of the camera made in accordance with the invention, as well as a high functional reliability.

In the embodiment shown in FIGS. 6–8 the motor 12x is arranged to adjust the diaphragm setting ring 29 and also the distance setting ring 3x. For this purpose, the motor 12x cooperates with groups or trains of gears, one of which is connected to the setting ring 3x and comprises the gears 47, 48, 49 and 50 whereas the other is associated with the diaphragm setting ring 29 and is constituted of the gear 51 and the pinion 52.

The said groups of gears or gear trains can be alternately connected to the electric motor 12x by means of a manually operable coupling device comprising a rocker bearing in the form of two pivoted arms 53, 54. One arm 53 is disposed within the shutter at the shutter base plate 25 and is pivotally movable about a pin 55 mounted on the base plate in alignment with the axis of the motor 12x. The other arm 54 is mounted at the rear of the shutter and is pivotal about a pin 56 mounted on the bottom 23c of the shutter housing 23, the pin 56 being also aligned with the axis of the motor 12x. The two arms 53, 54 are connected to each other by a shaft 57 which extends through slots provided in the shutter base plate 25 and the rear wall 23c of the shutter housing 23. The said slots are curved and arranged concentrically with respect to the axis of the motor 12x.

Two additional slots (not numbered) arranged to be concentric with the axis of the shutter, are provided in the rear plate 29x of the diaphragm setting ring, to provide clearance for the shaft 57 and the pin 56. The lengths of these slots are sufficient to accommodate the maximum range of adjustment of the diaphragm setting ring 29, as may be readily understood.

A gear 58 is secured to one end of the shaft 57, that end which is located in the interior of the shutter. The gear 58 is rigid with the shaft 57 and meshes with a pinion 59 carried by the motor spindle. Attached to the opposite end of the shaft 57 (which end is located outside of the shutter) is a pinion 60.

The rocker bearing comprising the pivoted arms 53, 54 is acted on by a spring (not shown) which tends to keep the pinion 60 constantly in engagement with the transmission gear 51 (see FIGS. 6 and 9), the said gear bearing on a spindle 61 carried by the camera case 1a and located, together with the pinion 60, in a milled recess 62 in the front wall of the camera case. Also disposed in the recess 62 is the pinion 52 meshing with the gear 51, and the pivoted arm 54, all as shown in FIG. 6

The pinion 52 is mounted on an end portion of a shaft 63 located outside of the shutter, the said shaft being disposed parallel to the axis of the shutter. The other or inner end of the shaft 63 is enclosed by the cylindrical jackets of the setting rings 24 and 29, and is provided with a pinion 64 meshing with a toothed rim 65 provided on the interior of the diaphragm setting ring 29. The train of gears 59, 58, 60, 51, 52, 64 and 65 thus effects a driving connection between the motor 12x and the cam ring 34 which latter is drivingly connected to the diaphragm setting ring 29.

For the purpose of actuating the rocker bearing comprising the arms 53, 54 a coupling rod 66 is provided (see FIGS. 6, 7 and 9), said rod being disposed in the camera case 1a and being shiftable in a plane perpendicular to the axis of the shutter. The coupling rod 66 has at one end a slot 66a which is open at one side of the rod and which accommodates a pin 57a provided on one end of the shaft 57. When the coupling rod 66 is moved in the direction of the arrow (see FIG. 9) by means of a device to be described later, the shaft 57 is shifted laterally by means of the pin 57a, and the two pivoted arms 53, 54 are swung about the pivot pins 55 and 56 in the direction of the arrow shown on the arm 54 in FIG. 9. This effects a disengagement of the gears 60 and 51. However, the gears 58 and 59 remain engaged with each other, due to the location of the pins 55, 56 in alignment with the axis of the gear 59.

After only a short pivotal movement of the rocker arms 53, 54, i.e. as soon as the gears 60, 51 are disengaged, the gear 58 will mesh with a gear 47 (FIG. 7). This establishes a reliable positive driving connection between the motor 12x and the second group of gears or gear train 47, 48, 49, 50 effecting an adjustment of the distance setting ring 3x.

Of the above mentioned group, gears 47 and 48 are positioned on the shutter base plate 25 (in a manner not shown in detail in the drawings) whereas the gear 49 is fixedly attached to one end of the turnable shaft 67, see FIG. 8, having a bearing on the bottom of the shutter base plate 25 and also in the top plate 27 of the shutter (see FIG. 8). The gear 50 is mounted on the forward extremity of the shaft 67 and meshes with a toothed rim 68 provided on the outer periphery of the range or distance setting ring 3x.

Both the gear 50 and the gearing 68 are completely covered by the front plate 27, as shown, providing an advantageous construction which is simple and effective in operation.

In accordance with the present invention there is provided a separate, manually operable control device or means for energizing and deenergizing the motor 12x connecting and disconnecting the motor 12x, as it affects each of the setting members 29 and 3x controlling the diaphragm opening and distance setting or focus. As with the embodiment of the invention illustrated in FIG. 1, these control devices are housed in the upper portion of the camera case 1a. As illustrated in FIGS. 6 and 7, the said control devices comprise two switch handles 69, 70 projecting from the top of the camera case 1a, said switch handles being each oppositely turnable for effecting clockwise and counterclockwise rotation of the motor 12x. The switch handles 69, 70 are associated respectively with reversing switch structures 17 as shown in FIG. 6 which are similar in all details to the similarly-numbered reversing switches shown in FIGS. 1, 3, 4 and 5. The mode of operation of the reversing switch 17 has already been explained in detail above in connection with the first illustrated embodiment of the invention, and accordingly will not be discussed in great detail at this point. As may be seen from an inspection of FIG. 6, the brushes 19 and 20 of the reversing switches are connected in parallel, that is, respectively joined to each other and the same is true of the sectors 17b and 17c. Actuation of the switch having the handle 69 effects an adjustment of the diaphragm setting ring 29 as will hereinafter be explained, whereas actuation of the switch having the handle 70 effects an adjustment of the distance setting ring 3x (also to be explained). In order to provide for powered adjustment of only one of the setting members or rings at a time, there is provided in accordance with the invention an interlocking means by which the switch handles 69, 70 are interconnected in a manner to prevent their simultaneously operating the motor 12x.

In accomplishing this there is utilized in the embodiment of FIGS. 6–9 a mechanical type of interlock involving the rocker bearing arms 53, 54 and the gears 58, 60 as well as the coupling rod 66 (FIG. 9).

Instead of causing such a mechanical device to effect the interlock, an electrical type of interlocking means may be employed. The choice as to which type of locking system is utilized will depend to a great extent on the availability of space within the particular camera.

As shown in FIGS. 6 and 7, the mechanical locking device comprises in addition to the aforementioned members, an extension on the switch arm 70 in which a pin 71 is carried, said pin projecting into the camera case 1a through an arcuate slot (not shown). The inner end of the pin 71 engages one end of a push rod 73 carried in guides 72a and 72b provided within the case 1a, said push rod having an offset portion or elbow 73a as seen in FIG. 7. Engaged with the offset portion 73a is one end 74a of a two-armed lever 74 which is pivotally carried by a pin 76 mounted on small pedestals 75. The remaining arm of the lever 74 is disposed adjacent and engaged with an end 66b of the coupling rod 66 (FIG. 6) the said end 66b projecting into the top portion of the camera case 1a and being also extended at an angle with respect to the rod. Considering FIG. 9, the push rod or coupling rod 66 is biased by a spring (not shown) in a direction opposite to that indicated by the arrow, and such biasing action effects a positive abutting driving connection between the push rod 73 and the coupling rod 66.

The above described interlocking or disconnecting control device operates as follows:

As already stated, the gear 60 when in its normal position (that is, with the switch handles 69, 70 disposed as shown in FIG. 6 and the switches 17 opened circuited) remains in engagement with the gear train including the gear 51 which is provided for setting the diaphragm ring 29. When the switch handle 69 which controls the adjustment of the setting ring 29 is actuated, the motor 12x turns in either a clockwise or a counterclockwise direction, depending on the direction in which the switch handle 69 has been shifted. This effects a drive of the diaphragm setting ring 29 in either one direction or the other. Thus, the operation of the switch handle 69 does not cause any disengagement between the pinion 60 and the gear 51.

However, when the switch handle 70 which is intended to control the distance setting ring 3 is actuated, the push rod 73 is displaced by the pin 71, causing one of the oblique portions of the elbow 73a to act on the lever arm 74a of the lever 74, pressing the said arm downward as seen in FIG. 7. The remaining arm of the lever 74, which is engaged with the bent end 66b of the coupling rod 66 now moves upward, and in so doing it enables the rod 66 to shift upward or in the direction of the arrow shown in FIG. 9. The gears 51 and 60 are now disengaged by virtue of the swinging movement of the pivoted arms 53, 54 and thereafter the gear 58 is made to mesh with the gear 47 which constitutes a portion of the gear train for adjustment of the distance setting ring 3.

The said disengagement and engagement of the above gears and the switching or energizing of the motor 12x are mutually adjusted or related in a manner that the motor is switched on only after the meshing of the new gear drive has been started.

The above described organization results in an advantageous arrangement where, in a simple and reliable manner upon the switch handle being restored to its "rest" position, the gears 58, 47 will be disengaged and the gears 60, 51 again engaged as before. The gear 60 is always meshing with the gear 51 when the switch handles are in their normal or "rest" positions. Thus, the two trains of gears always occupy the same starting positions regardless of which setting member has been previously adjusted, and without cancelling any previous adjustment or prior coupling or meshing condition the actuation of either of the switch handles 69, 70 will always result in the proper gear train associated with such switch handle being brought into action, to effect the powered adjustment of the associated setting member. On the other hand, even if the two switch handles 69 and 70 were to be actuated simultaneously only a single setting member would be adjusted, this being the distance setting ring 3x as provided in the present embodiment of the invention. The reason, of course, is that the actuation of the push rod 73 inactivates the transmission to the diaphragm setting ring 29. The invention also covers the method of mutually connecting the two controls 69, 70 in such a manner that neither of them will be operative if an attempt is made to actuate them simultaneously. Such arrangement merely requires a simple mechanical rod system connecting the two switch handles 69, 70 to each other. This organization is shown in FIG. 13 of the drawings.

The mechanical interlock is constituted as follows:

The switch handle 70 may be rigid on a shaft 70a which is provided with a locking member 70b having a straight or flat side face. The switch handle 69 may be rigid on a shaft 69a provided with a locking member 69b also having a straight or flat side face. A locking link 73x is slidable in bushings, and has end shoes 73y and 73z respectively engageable with the locking members 70b and 69b. When any one of the shafts 70a, 69a is turned, it will cause the locking bar 73x to be in full engagement with the locking member of the remaining shaft, such as the engagement between the shoe 73y and the locking member 70b, thereby preventing any turning of the said shaft and the reversing switch which may be associated with it.

For the purpose of enabling the setting members 3x and 29 to be not only automatically adjusted by means of power but also to be manually set or adjusted, there are provided by the invention friction couplings or drive means 116, 117 (see FIGS. 6 and 8) disposed between the reduction gear trains and the setting members, as with the embodiment of FIGS. 1 and 2. The said friction couplings are shown diagrammatically in FIGS. 6 and 8.

FIGS. 10, 11 and 12 show another embodiment of the invention wherein a spring driven motive means is provided, in conjunction with reduction gears. As shown in FIGS. 10 and 11 the spring powered driving means is also disposed in the interior of the intra-lens shutter, being mounted on a shutter base plate 25x. However the spring powered motive means and reduction gearing may, with equal advantage, be disposed in the interior of the camera, as for example, in the upper portion of the same as was shown in FIG. 1 in connection with the electric motor 12.

In accordance with the invention, the spring powered driving means is so arranged that the spring thereof which drives the reduction gearing is stressed or cocked simultaneously with the setting or cocking of the shutter, this being effected by a member which cooperates with the shutter cocking mechanism. The details of such automatic cocking arrangement are shown in FIG. 10.

In this figure a well-known tensioning and driving disc 78 for stressing the shutter driving spring (not shown) is mounted on the shutter base plate 25x, on a shaft 77 passing through the rear wall of the shutter and connected with the film transporting mechanism of the camera in a well-known manner. Cooperable with the driving disc 78 is a two armed lever 79, which is pivotally mounted on the shutter base plate by means of a pivot screw 80. One arm 79a of the lever 79 cooperates with a pin 81 fixedly mounted on the upper side of the driving disc 78, whereas the remaining arm 79b cooperates with a pin 82 carried by a toothed segment 84 which is mounted on the base plate 25x by means of a pivot screw 83.

A spring 86 bears against the side wall 23x of the shutter housing and against a pin 85, thereby biasing the lever 79 in a counterclockwise direction. The toothed segment 74 is engaged by a spring 87, which biases the sector clockwise.

Transmission gears 88, 89 and 90 are mounted on the shutter base plate 25x and are constantly meshed and drivingly engaged with the segment 84 as shown. To delay or retard the running down movement of the gearing, an anchor 91 and anchor gear 92 are provided, the gear 92 being carried by a spur gear 93 which meshes with the gear or pinion 89 of the gear train.

A one armed lever 94 is pivotally mounted about an axis 95 and extends between the axes of the two gears 88, 90. The axis of rotation 95 is formed by a pivot pin 96 projecting from pinion 97 (FIG. 11). The pinion 97 is connected, by means of an interposed friction coupling 98, to a pinion 99 which has a bearing in the front plate 27 and which meshes with gear teeth 68x provided on the range setting ring 3x.

As shown in FIG. 10, a gear 102 is pivotally mounted on the lever 94 and serves as a transmission gear which is constantly meshing with the pinion 97. While maintaining a desired gear ratio, the measurements of the gear 102 and the axial spacing or distance between the centers of the gears 88, 90 are so selected that the teeth 102 are out of engagement with those of the gears 88 and 90 when the lever 94 is in its centralized position as shown in FIG. 10. Only when the lever 94 is swung either upward or downward as indicated by the arrows, will the gear 102 mesh with either the gear 88 or the gear 90.

In order to normally maintain the lever 94 in its center position as shown, a spring 103 is provided, engaging at its center a bolt 104 on the lever and at its ends pins 105 attached to the shutter base plate 25x.

For the purpose of coupling the gear 102 with one of the gears 88, 90 an arm or actuator pin 106 is carried by the lever and extends through the rear of the shutter assembly as seen in FIG. 11. The actuator pin 106 may be accommodated in suitable arcuate slots which are concentric with the axis of the shutter, to permit the limited swinging movement which is required of the lever 94. The actuator pin 106 is cooperable with an operating device shown diagrammatically in FIG. 12. The said operating device comprises a manually engageable fingerpiece or member 107 which protrudes from the upper side of the camera and is fixedly attached to a shaft 108 passing into the interior of the camera case. The shaft 108 has a bearing in the camera case, and at its inner end is provided with a laterally extending arm 109, said arm having a fork 109a into which the actuating pin 106 projects. When the finger piece 107 is swiveled or turned in one of the two directions indicated by the arrows, the lever 94 will also be pivoted by means of the members 108, 109 and 106, thereby causing the gear 102 to mesh with either the gear 88 or else the gear 90.

A locking and releasing device is also provided and illustrated in FIG. 10. This device cooperates with the lever 94 and comprises a ratchet wheel 110 which is fixedly carried by the gear 90 and is concentric therewith. A two-armed pawl or lever 112 is pivotally mounted by means of an axle 111 on the shutter base plate 25x. The pawl 112 is engageable with the ratchet wheel 110, having a ratchet tooth 112a. A spring 113 is provided to normally bias the pawl 112 in a counterclockwise direction, whereby the pawl normally prevents the ratchet wheel 110 from rotating clockwise. The pawl 112 has an arm 112b extending angularly as shown in FIG. 10, said arm engaging a cooperable arm 114a of a two-armed lever 114. The other arm 114b of the lever 114 has a recess 114c provided with two cams 114d and 114e which are located in the path of movement of the end 94a of the lever 94. A spring 115 acting on the lever 114 normally biases the lever in a clockwise direction, thereby to cause the lever arm 114b to remain continually in engagement with the end 94a of the lever 94.

The powered driving means shown in FIGS. 10, 11 and 12 operates in the following manner:

The well-known action of cocking the shutter causes the driving disc 78 to rotate in a counterclockwise direction (the direction of the arrow shown in FIG. 10) by way of the shaft 77. The pin 81 carried by the disc 78 engages the arm 79a of the two-armed lever 79, causing the latter to swing in a clockwise direction against the action of the biasing spring 86. The remaining arm 79b of the lever 79 now drives the pin 82 of the segment 84 ahead of it, causing the segment to pivot counterclockwise and in so doing to stress the spring 87 which is pivotally connected to the segment. Shortly before the shutter driving disc 78 reaches its end or fully cocked position, the pin 81 thereof and the lever arm 79a become disengaged so that the lever 79 is now able to snap back in a counterclockwise direction to its initial position as shown in FIG. 10 under the action of the spring 86. The pawl and ratchet wheel 110 maintain the spring 87 fully tensioned or stressed through the medium of the transmission gears 88, 89 and 90.

For the purpose of releasing the powered driving means which is now being held in the cocked condition by the pawl 112 the actuating lever 107 is swung in either one direction or the other, thereby effecting a pivotal movement of the lever 94 which is coupled to the fingerpiece 107 by way of the members 108, 109, and 106. The pivotal movement of the lever 94 is continued until the gear 102 engages and meshes with either the gear 88 or the gear 90. Shortly before the gear 102 is fully meshed with its cooperable gear, the end 94a of the lever 94 engages one of the cams 114e or 114d provided on the lever arm 114b, thereby causing the lever 114 to pivot in a counterclockwise direction.

The other lever arm 114a during such pivoting movement acts on the arm 112b of the pawl 112, effecting a disengagement of the ratchet tooth 112a from the ratchet gear 110 by virtue of the pawl 112 pivoting clockwise. Upon such movement the gear 102 is fully meshed with one of the gears 88, 90 so that the gear drive is now conditioned for operation and running down movement under the action of the spring 87 and control of the anchor wheel 92 and anchor 91.

Depending on whether the gear 102 meshes with the gear 88 or the gear 90 the pinions 97 and 99 will be driven either clockwise or counterclockwise, resulting in an adjustment of the distance setting ring 3x so long as the actuating fingerpiece 107 is held in its deflected position. After the fingerpiece 107 is released, the lever 94 may return to its centralized position under the action of the spring 103, and the gear 102 will be disengaged from either the gear 88 or the gear 90. Since the lever 104 is no longer engaged with either of the cams 114e or 114d when it is in its center position, the pawl 112 is again permitted to engage the ratchet gear 110 thereby to stop the entire driving device. After the shutter has run down and the driving disc 78 has returned to its starting position as shown in FIG. 10 it becomes possible to again set or cock the driving powered device in the previously described manner.

The foregoing pages have described a spring powered driving device for driving a single setting member, this being the distance or range setting ring 3x as shown in the illustrated embodiment. It is within the scope of the invention to drive instead of a single setting member, several setting members by means of the above spring powered driving mechanism, as for example in the manner shown in connection with the embodiment of the invention illustrated in FIGS. 6–9.

Regardless of how the invention may be developed in detail, the provision of a conveniently operable, connectable and disconnectable powered driving device for effecting a powered adjustment of one or more of the setting members, as for example, the diaphragm, shutter speed or distance setting members, in a photographic camera provides the desirable advantage of a greatly simplified operation, and one which may be carried out much more quickly. That is, the time required for readying the camera to take a photograph is greatly lessened, as well as the setting operation being simplified and made more convenient.

The invention is not affected by the fact that photographic cameras exist, having automatic exposure control or regulation wherein electric adjustment motors are utilized with such automatic control. The invention differs from these known arrangements mainly in that the well-tested indicated operations and means for setting the setting members, which have been proved to be especially trouble free are retained whereas the measures or operations required to effect adjustment of the setting member are limited to slight finger pressures and to an easily understood eye control, as for example, the observation of coincidence between two needles.

With prior cameras of the above type the automatic setting follows the actuation of the camera release, and thus a setting cannot be effected without resulting in an exposure. With the construction of the present invention the exposure setting is independent of operation of the camera release, and thus as many settings as desired may be effected without requiring that an exposure be made.

A camera constructed in accordance with the invention is characterized by a maximum of practical, meaningful automatization, for the purpose of which only those structural members have been used which are well tested with respect to functional reliability.

A further development of the invention with respect to the provision of releasable coupling means, especially friction couplings or drive elements, between the setting member and the powered driving devices associated therewith produces the additional and especially important advantage that the well-known manual operation of the setting members can be effected in a simple and convenient manner, in the event that there is no longer available any driving energy for the powered driving means, as for example, if the battery should become exhausted or the driving spring should become inoperative.

I claim:

1. In a photographic camera of the type having diaphragm, speed and distance setting members, in combination, a powered driving device movable in two opposite directions; and manually operable means independently actuable with respect to the camera or shutter release member for switching on said device to drive at least one of said setting members for effecting a powered adjustment of the same in one of two opposite directions, and for switching off said device when said setting member has reached its adjustment position.

2. The invention as described in claim 1, in which there is means including a releasable coupling connected between the said device and one setting member, for effecting a transmission of movement therebetween.

3. The intention as described in claim 2, in which the releasable coupling is constituted as a friction drive.

4. The invention as described in claim 1, in which the powered driving device comprises a low voltage electric motor operable on direct current.

5. The invention as described in claim 4, in which the electric motor is of the high-speed miniature type, and in which the means effecting a transmission of movement comprises a speed-reduction transmission having gears, connected between the motor and said one setting member.

6. The invention as described in claim 5, in which the camera has a case, and in which the electric motor and speed-reduction transmission are disposed in the interior of the said case.

7. The invention as described in claim 3, in which the friction drive is connected between a speed-reducing portion of the transmission and the one setting member.

8. The invention as described in claim 5, in which there is a shutter housing, and in which the electric motor and speed reduction transmission are disposed in the interior of the shutter housing.

9. The invention as described in claim 1, in which there is an automatic exposure regulator including an exposure meter having a needle, a cooperable tracing member associated with said needle to be brought into coincidence therewith, and a coupling between the one of said setting members for diaphragm and speed and said tracing member, said coupling including a control member movable simultaneously with the setting member, and in which there is a transmission by which the driving device is connected to drive the said control member.

10. The invention as described in claim 9, in which the diaphragm and speed setting members are separately operable, the diaphragm setting member constituting the said setting member, and in which there are means including the said coupling for drivingly connecting the speed setting member to the tracing member, said powered driving device effecting a powered adjustment of the said diaphragm setting member by way of the said transmission and control member.

11. The invention as described in claim 1, in which there is an additional and separate manually operable means for rendering said driving device operative to drive another one of the said setting members for effecting a powered adjustment of the same, and for rendering said device inoperative to drive the other setting member, when said member has reached its adjustment position.

12. The invention as described in claim 11, in which there are reversing means associated respectively with the said manually operable means whereby the powered driving device may be run in both clockwise and counterclockwise directions.

13. The invention as described in claim 11, in which there are means for rendering inoperative one of said manually operable means when the other of the manually operable means is causing the driving device to be operative.

14. The invention as described in claim 1, in which the driving device comprises a spring-powered reduction gear.

15. The invention as described in claim 14, in which there are manually operable means for cocking the shutter, and means connected with said shutter cocking means for cocking the spring-powered reduction gear simultaneously with cocking of the shutter.

16. The invention as described in claim 14, in which the reduction gear includes a manually operable selective gear means for effecting either forward or reverse movement of the output member of the reduction gear.

17. The invention as described in claim 16, in which there is a releasable means for locking the reduction gear in cocked position, and means operable with said selective gear means, for releasing said locking means to free the reduction gear for running down movement.

References Cited in the file of this patent

UNITED STATES PATENTS

| | | |
|---|---|---|
| 2,780,971 | Fahlenberg | Feb. 12, 1957 |
| 2,868,095 | Gebele | Jan. 13, 1959 |
| 2,887,026 | Rentschler | May 19, 1959 |
| 2,913,969 | Faulhaber | Nov. 24, 1959 |
| 2,922,347 | Hahn | Jan. 26, 1960 |
| 2,923,216 | Greger | Feb. 2, 1960 |
| 2,925,760 | Broschke | Feb. 23, 1960 |
| 2,932,242 | Greger | Apr. 12, 1960 |